United States Patent
Pratt et al.

(10) Patent No.: US 6,689,194 B2
(45) Date of Patent: Feb. 10, 2004

(54) FUEL CELL SYSTEM HAVING A REPLACEABLE GETTER ELEMENT FOR PURIFYING THE FUEL SUPPLY

(75) Inventors: Steven D. Pratt, Plantation, FL (US); Sivakumar Muthuswamy, Plantation, FL (US); Ronald J. Kelley, Coral Springs, FL (US); Robert W. Pennisi, Boca Raton, FL (US)

(73) Assignee: Motorola, Inc, Schaumburg, IL (US)

( * ) Notice: Subject to any disclaimer, the term of this patent is extended or adjusted under 35 U.S.C. 154(b) by 0 days.

(21) Appl. No.: 09/803,190

(22) Filed: Mar. 12, 2001

(65) Prior Publication Data

US 2002/0127458 A1 Sep. 12, 2002

(51) Int. Cl.[7] .......................... B01D 53/04; H01M 8/04
(52) U.S. Cl. ................... 95/139; 95/140; 96/117.5; 96/151; 423/230; 423/247; 429/12; 429/13
(58) Field of Search ............... 95/90, 139, 140, 95/25; 96/117.5, 108, 151; 423/230, 231, 247; 429/12, 13, 26

(56) References Cited

U.S. PATENT DOCUMENTS 5,595,949 A * 1/1997 Goldstein et al. ........... 423/220
5,604,047 A * 2/1997 Bellows et al. .............. 429/17
6,063,515 A   5/2000 Epp et al. .................... 429/17
6,245,214 B1 * 6/2001 Rehg et al. ................. 205/763
6,309,771 B1 * 10/2001 Faris et al. .................. 429/127

FOREIGN PATENT DOCUMENTS

JP    4-206161 A  * 7/1992
JP    9-204925 A  * 8/1997
JP   11-278807 A  * 10/1999

OTHER PUBLICATIONS

Edwards, N., Ellis, S.R., Frost, C., Golunski, S.E., van Keulen, A.N.J., Lindewald, N.G. and Reinkingh, J.G., "On–board Hydrogen Generation for Transport Applications: The HotSpot® Methanol Processor," Johnson Matthy Technology Center, U.K., Elsevier Science S.A. 1998.

* cited by examiner

Primary Examiner—Frank M. Lawrence
(74) Attorney, Agent, or Firm—Randil L. Dulaney

(57) ABSTRACT

Oxides of carbon and other impurities are removed from a hydrogen fuel supply stream (12) for a fuel cell (30). A getter element (20) sufficient for chemisorbing the oxides of carbon from the hydrogen is removably connected to the fuel cell anode side. The fuel stream is passed through the getter element so as to chemisorb the oxides of carbon onto the getter, thereby providing a purified stream of hydrogen (26) to the fuel cell anode. The getter is removed from the fuel cell when the getter is spent and replaced with a fresh getter.

12 Claims, 1 Drawing Sheet

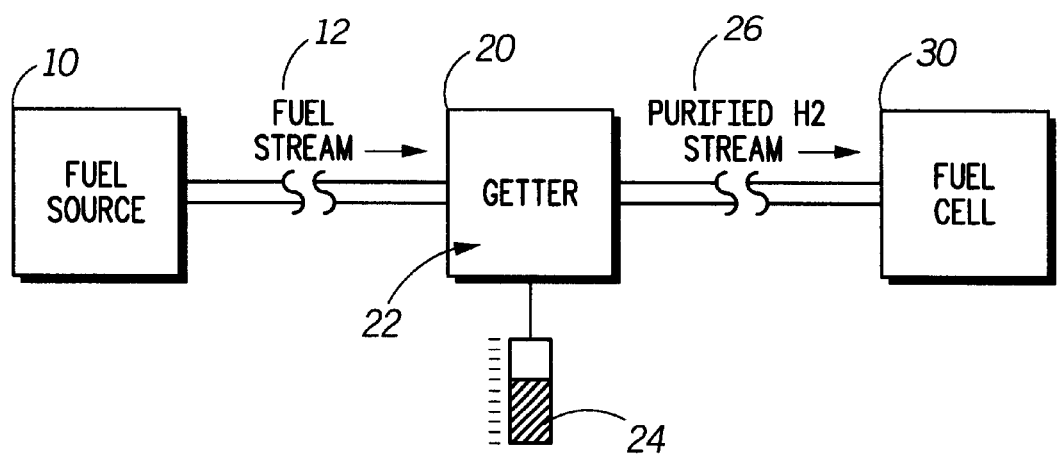

US 6,689,194 B2

FUEL CELL SYSTEM HAVING A REPLACEABLE GETTER ELEMENT FOR PURIFYING THE FUEL SUPPLY

TECHNICAL FIELD

This invention relates in general to fuel cells, and more particularly to an apparatus and method for removing impurities from a hydrogen fuel supply stream.

BACKGROUND

Fuel cells are electrochemical cells in which a free energy change resulting from an oxidation reaction is converted into electrical energy. A typical fuel cell consists of a fuel electrode (anode) and an oxidant electrode (cathode), separated by an ion-conducting electrolyte. The electrodes are connected electrically to a load (such as an electronic circuit) by an external circuit conductor. In the circuit conductor, electric current is transported by the flow of electrons, whereas in the electrolyte it is transported by the flow of ions, such as the hydrogen ion (H+) in acid electrolytes, or the hydroxyl ion (OH−) in alkaline electrolytes. A fuel capable of chemical oxidation is supplied to the anode and ionizes on a suitable catalyst to produce ions and electrons. Gaseous hydrogen is the fuel of choice for most applications, because of its high reactivity in the presence of suitable catalysts and because of its high energy density. Similarly, an oxidant is supplied to the fuel cell cathode and is catalytically reduced. The most common oxidant is gaseous oxygen, which is readily and economically available from the air for fuel cells used in terrestrial applications. When gaseous hydrogen and oxygen are used as a fuel and oxidant, the electrodes are porous to permit the gas-electrolyte junction to be as great as possible. The electrodes must be electronic conductors, and posses the appropriate reactivity to give significant reaction rates. Since the electrolyte is a non-electronic conductor, the electrons flow away from the anode via the external circuit. At the cathode, oxygen reacts with the hydrogen ions migrating through the electrolyte and the incoming electrons from the external circuit to produce water as a byproduct. The byproduct water is typically extracted as vapor. The overall reaction that takes place in the fuel cell is the sum of the anode and cathode reactions, with part of the free energy of reaction released directly as electrical energy and the remainder as heat.

In recent years, nearly all electronic devices have been reduced in size and made lightweight, in particular portable electronic devices. At the same time, energy hungry features such as full color displays, multimedia, large bandwidth data transmission and 'always on, always connected' have pushed traditional electrolytic battery technology to the limits. Some have sought to replace electrolytic batteries with small fuel cells. The tremendous advantage of fuel cells is the potential ability to provide significantly larger amounts of energy in a small package (as compared to a battery) However, the problem of how to provide the supply of hydrogen fuel to the fuel cell still seeks an elegant and practical solution before widespread consumer acceptance occurs. Even with seven decades behind us since the Hindenberg disaster, consumers remain wary of hydrogen gas, and there is no infrastructure to provide hydrogen to refill exhausted fuel cells.

Some prior art systems use liquid methanol as the source of hydrogen, by catalytically converting or 'reforming' the methanol into hydrogen using miniature reforming devices. U.S. Pat. No. 6,063,515 by Epp and Baumert, assigned to Ballard Power Systems, is one such example, and describes an integrated fuel cell electric power generation system for submarine applications. Liquid methanol is easy to obtain and does not suffer from the same public safety perceptions as does hydrogen gas. One major stumbling block with the reformer approach is that the reforming process does not provide a pure supply of hydrogen gas, but rather the 'reformate' contains trace amounts of oxides of carbon, such as carbon monoxide (CO), which aggressively attack and poison the platinum catalyst in the fuel cell. These impurities in the hydrogen fuel stream result in continuous performance degradation and eventual failure of the fuel cell. To reduce impurities in the reformate requires additional stages in the reforming process and complex, expensive reforming apparatus. One such example is the HOT-SPOT multi-stage reactor by Johnson Matthey, as published in *European Fuel Cell News*, Vol. 3, No. 2, 1996. These disadvantages negate the use of reformers for small, portable fuel cell systems because of size, weight and cost. It would be an advancement in the art of fuel cell systems to have a small, inexpensive reformer to convert liquid methanol to hydrogen gas coupled to a simple means for reducing contaminants such that performance is not degraded.

BRIEF DESCRIPTION OF THE DRAWINGS

The sole drawing FIGURE is a schematic representation of a system for removing impurities from a fuel supply stream for a fuel cell, in accordance with the invention.

DETAILED DESCRIPTION OF THE PREFERRED EMBODIMENT

Oxides of carbon and other impurities are removed from a hydrogen fuel supply stream for a fuel cell. A getter element sufficient for chemisorbing the oxides of carbon from the hydrogen is removably connected to the fuel cell anode side so as to be easily replaced when spent. The fuel stream is passed through the getter element so as to chemisorb the oxides of carbon onto the getter, thereby providing a purified stream of hydrogen to the fuel cell anode. The getter is removed from the fuel cell when the getter is spent, and then replaced with a fresh getter. A visual indicator on the getter element can be used to indicate when the getter needs replacement. While the specification concludes with claims defining the features of the invention that are regarded as novel, it is believed that the construction, method of operation and advantages of the invention will be better understood from a consideration with the drawing figure.

Referring now to the single drawing FIGURE, a fuel stream purification system 5 for a fuel cell 30 operates in the following manner. A fuel source 10 provides a fuel stream 12 that typically contains impurities that are potentially harmful to the fuel cell 30. In the preferred embodiment the fuel source is a chemical reformer for reforming liquid methanol into hydrogen and the fuel stream is known as the reformate, but alternatively the fuel source could be a hydrogen gas cylinder, hydrogen generator, municipal fuel supply line, metal hydride, etc. Chemical reformers for other hydrocarbon fuels such as gasoline may also serve as the fuel source. The fuel stream 12, i.e. reformate, usually contains trace amounts of oxides of carbon impurities that are harmful to the fuel cell or detrimental to the fuel cell performance, such as carbon monoxide (CO) and/or carbon dioxide (CO2). CO damages the fuel cell by attacking the platinum catalyst at the anode electrode. CO2, while not directly damaging to the fuel cell, limits performance by diluting the molar volume of hydrogen delivered to the anode electrode. Typical contaminant levels found in the reformate of small, inexpensive chemical reformers for portable fuel cell systems are 5 mole % CO and 15 mole % $CO_2$. Levels of CO above 40 ppm result in performance degradation and eventual failure of the fuel cell. Present day fuel cell systems utilizing reformed hydrocarbon fuels either require large, expensive multi-stage chemical reformers, scrubbers and filters or they have a limited life due to contamination, thus excluding such fuel cell systems for practical use in portable electronic equipment.

In our invention, the fuel stream 12 is purified by passing it through a getter element 20. A getter is a substance that binds gases on its surface. Active gases are chemisorbed and/or physisorbed onto the surface, while other gases pass by unaffected. Chemisorption is a well-known chemical adsorption process in which weak chemical bonds are formed between gas or liquid molecules and a solid surface. Getters are commonly used to remove contaminants from gases, and are differentiated from particulate filters. Rather than 'filtering' contaminants by mechanical size exclusion principles, getters tend to adsorb impurities. The getter element 20 contains a material 22 that chemisorbs the impurities from the fuel stream 12. Materials suitable for the present invention include platinum, silver, tungsten, glass powder, mica, charcoal, iron and iron compounds. A commercially available material useful for chemisorbing $CO_2$ is ASCARITE, which are asbestos fibers coated with sodium hydroxide. ASCARITE is used for adsorbing $CO_2$ in combustion analyzers. Optionally, a portion of the heat generated by the fuel cell 30 may be thermally transferred to the getter element 20 while the fuel stream 12 is being passed through the getter 20 so as to improve the chemisorption performed by the getter 20. The getter element 20 optionally includes a visual indication means 24 that communicates to the user when it has reached its capacity and is exhausted, used up, depleted, expired, consumed or spent, and needs to be replaced. Several methods of monitoring or measuring the remaining capacity of a getter element are known in the industry, such as incorporating materials that change color to indicate the amount of CO or $CO_2$ taken up, electronic gauges, measuring and comparing the amount of impurities in the incoming stream and the 'purified' exit stream, etc.

The getter element 20 is removably connected to the anode side of the fuel cell in such a way that it can be easily removed by the human user and replaced with a fresh getter element. The term 'removably connected' means that the getter and the fuel cell are two separate individual pieces and are not permanently joined together, nor are they a monolithic one piece unit. It is intended that the getter be attached to the fuel cell in such a way that it can be easily and quickly separated from the fuel cell without damage to the fuel cell, or without the need of a plurality of tools. For example, one means of providing a 'removably connected' assembly is to use quick disconnect gas fittings between the getter element, the fuel source, and the fuel cell. The getter element may be mechanically attached to the fuel cell by a snap fit or other conventional latch mechanisms, it may be screwed on, it may be sealed in place by o-rings and bosses, etc. We do not contemplate the definition of 'removably connected' to include a getter that is adhesively bonded or injection molded to the fuel cell or connected by means of compression fittings or SWAGE-LOK fittings.

After passing through the removably connected getter element 20, the purified fuel stream 26 flows to the fuel cell 30. In the preferred embodiment, the purified fuel stream 26 comprises hydrogen gas. For the purpose of the present invention, purified is defined as having a CO level less than 40 ppm.

The reformate exiting the chemical reformer is composed mainly of hydrogen gas in addition to trace amounts of CO and $CO_2$. The reformate is passed through the getter element containing platinum, silver, tungsten, glass powder, mica, charcoal, iron or iron compounds, where the CO and $CO_2$ is chemisorbed, and purified hydrogen gas is exported to the fuel cell. After a period of use, the platinum, silver, tungsten, glass powder, mica, charcoal, iron or iron compounds in the getter is exhausted, and the spent getter is removed from the system and replaced with a fresh getter. For a typical usage model for a consumer hand held electronic device powered by a fuel cell system, the getter element should be designed and sized to last at least one week before it needs replacing. By utilizing the present invention, inexpensive small reformers can be used in a portable fuel cell application to reform liquid hydrocarbon fuels such as methanol to obtain hydrogen gas for powering the fuel cells. The sacrificial getter element obviates the need for more elaborate, larger and more expensive reforming processes and equipment by allowing a less-pure reformate as a fuel supply, and, hence, allowing for portable reformer-based fuel cell systems of practical size and cost.

In summary, we have created a novel means to reduce the concentration of impurities in a fuel stream for a fuel cell, thus making it possible to use miniature, inexpensive reformers and liquid methanol fuel in a portable fuel cell system to power hand held electronic devices. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A system for removing impurities including carbon monoxide and carbon dioxide from a fuel supply stream for a fuel cell, comprising a getter element for removing the impurities from the fuel stream, wherein the getter element removes impurities from the fuel stream by chemisorbing the impurities, the getter element being removably connected to an anode side of the fuel cell so as to be replaceable by a human user of the fuel cell.

2. The system as described in claim 1, wherein the fuel stream comprises hydrogen gas.

3. The system as described in claim 1, further comprising a chemical reformer coupled to the getter element, so as to pass the fuel stream from an exit side of the chemical reformer to the getter element.

4. The system as described in claim 3, wherein the chemical reformer is a micro-reformer.

5. The system as described in claim 3, wherein the chemical reformer reforms methanol.

6. The system as described in claim 1, wherein the getter element further removes impurities from the fuel stream by physisorbing the impurities.

7. The system as described in claim 1, further comprising a visual indicia for indicating a status of the getter element.

8. A system for removing carbon monoxide and carbon dioxide from hydrogen produced from a chemical reformer for a fuel cell, comprising a getter element for chemisorbing the carbon monoxide and carbon dioxide from the hydrogen, the getter element being removably connected to an anode side of the fuel cell so as to be replaceable by a human user of the fuel cell when the getter element is spent.

9. A method of operating a fuel cell having an anode side and a cathode side, the method comprising:

providing a supply of fuel;

providing a getter for removing impurities including carbon monoxide and carbon dioxide from the fuel, the getter being removably connected to the anode side of the fuel cell; and passing the fuel through the getter so as to remove the impurities, thereby providing a purified stream of fuel to the fuel cell.

10. The method as described in claim 9, further comprising:

removing the getter when the getter is spent; and replacing the spent getter with a fresh getter.

11. The method as described in claim 9, wherein a portion of heat generated by the fuel cell is thermally transferred to the getter during the step of passing the fuel through the getter so as to chemisorb the impurities onto the getter.

12. A method of operating a fuel cell having an anode side and a cathode side, the method comprising:

providing a fuel stream containing hydrogen and carbon monoxide and carbon dioxide;

providing a getter for chemisorbing the carbon monoxide and carbon dioxide from the fuel stream, the getter being removably connected to the anode side of the fuel cell;

passing the fuel stream through the getter so as to chemisorb the carbon monoxide and carbon dioxide onto the getter;

removing the getter when the getter is spent; and replacing the spent getter with a fresh getter.

\* \* \* \* \*